(12) United States Patent
Kocksch et al.

(10) Patent No.: US 11,351,485 B2
(45) Date of Patent: Jun. 7, 2022

(54) ROUND FILTER ELEMENT OF A FILTER FOR UREA-WATER SOLUTION AND FILTER

(71) Applicant: MANN+HUMMEL GmbH, Ludwigsburg (DE)

(72) Inventors: Christian Kocksch, St. Leon-Rot (DE); Christopher Banks, Kenzingen (DE); Bastian Mueller, Neustadt (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/893,089

(22) Filed: Jun. 4, 2020

(65) Prior Publication Data
US 2020/0368648 A1 Nov. 26, 2020

Related U.S. Application Data

(63) Continuation of application No. PCT/EP2018/082624, filed on Nov. 27, 2018.

(30) Foreign Application Priority Data

Dec. 7, 2017 (DE) .......................... 102017011279.7

(51) Int. Cl.
*B01D 29/23* (2006.01)
*B01D 29/92* (2006.01)
(Continued)

(52) U.S. Cl.
CPC ........... *B01D 29/23* (2013.01); *B01D 29/925* (2013.01); *C02F 1/001* (2013.01);
(Continued)

(58) Field of Classification Search
CPC ...... B01D 2201/295; B01D 2201/4084; B01D 29/23; B01D 29/925; B01D 2201/0415;
(Continued)

(56) References Cited

U.S. PATENT DOCUMENTS

| 7,237,682 B2 | 7/2007 | Reynolds et al. |
| 7,513,373 B2 | 4/2009 | Kramer |

(Continued)

FOREIGN PATENT DOCUMENTS

| DE | 102012223009 A1 | 6/2014 |
| DE | 102012223020 A1 | 6/2014 |

(Continued)

*Primary Examiner* — Terry K Cecil (57) ABSTRACT

A round filter element of a filter for a urea-water solution has a filter bellows with a filter medium that continuously extends circumferentially, relative to a filter element axis, around an element interior. An end body is fastened to an end face of the filter bellows and provided with a connecting section for fastening the round filter element to a housing cover of a filter housing of the filter. The end body has a central opening communicating with the element interior. The central opening has a central insertion section for receiving a flexible separation section of a volume compensation device of the filter and has an outer flow-through section enabling flow of the urea-water solution out of the filtration volume or into the filtration volume. The filter has a volume compensation device with a flexible separation section that separates a compensation volume from the filtration volume of the filter.

7 Claims, 6 Drawing Sheets

(51) Int. Cl.
  *C02F 1/00* (2006.01)
  *C02F 101/30* (2006.01)
  *C02F 101/16* (2006.01)

(52) U.S. Cl.
  CPC .................. *B01D 2201/295* (2013.01); *B01D 2201/4084* (2013.01); *C02F 2101/16* (2013.01); *C02F 2101/30* (2013.01)

(58) Field of Classification Search
  CPC .............. B01D 2201/305; C02F 1/001; C02F 2101/16; C02F 2101/30; F01N 2610/02; F01N 2610/1426; F01N 2610/1486; F01N 2610/1446; F01N 2260/10
  See application file for complete search history.

(56) References Cited

U.S. PATENT DOCUMENTS

| | | | |
|---|---|---|---|
| 9,731,224 B2 | 8/2017 | Kocksch | |
| 10,100,697 B2* | 10/2018 | Neelagal | F01N 3/2066 |
| 2002/0189982 A1* | 12/2002 | Jousset | B01D 29/96 |
| | | | 210/85 |
| 2010/0314308 A1 | 12/2010 | Pflueger et al. | |
| 2017/0292425 A1 | 10/2017 | Neelagal et al. | |

FOREIGN PATENT DOCUMENTS

| | | |
|---|---|---|
| DE | 102012223028 A1 | 6/2014 |
| DE | 102012223033 A1 | 6/2014 |
| DE | 102016005659 A1 | 11/2017 |
| WO | 2012007337 A1 | 1/2012 |

\* cited by examiner

ROUND FILTER ELEMENT OF A FILTER FOR UREA-WATER SOLUTION AND FILTER

CROSS-REFERENCE TO RELATED APPLICATIONS

This application is a continuation application of international application No. PCT/EP2018/082624 having an international filing date of 27 Nov. 2018 and designating the United States, the international application claiming a priority date of 7 Dec. 2017 based on prior filed German patent application No. 10 2017 011 279.7, the entire contents of the aforesaid international application and the aforesaid German patent application being incorporated herein by reference.

BACKGROUND OF THE INVENTION

The invention concerns a round filter element of a filter for urea-water solution (UWS).

EP 1 638 664 B1 discloses a filter element. The filter element comprises a ring of filter media that delimits a central hollow chamber and comprises a first end and a second end, a first end cap that is connected seal-tightly to the first end of the media ring, and a second end cap that is connected seal-tightly to the second end of the media ring. The second end cap comprises a series of flexible elongate locking fingers which are embodied monolithically with the second end cap and project axially outwardly from the outer surface of the second end cap.

The fingers are arranged about the outer circumference rim of the second end cap and contain radially inwardly oriented noses at the distal end of the fingers.

SUMMARY OF THE INVENTION

The invention has the object to design a round filter element and a filter of the aforementioned kind such that a volume change of the urea-water solution in particular due to temperature changes can be compensated.

This object is solved according to the invention for a round filter element in that the at least one end body comprises a central opening communicating with the element interior wherein the central opening comprises a central insertion section for insertion of at least one flexible separation section of a volume compensation device and at least one outer flow-through section for flow of urea-water solution out of or into the filtration volume.

The invention concerns a round filter element of a filter for urea-water solution (UWS), that may have:
a filter bellows with at least one filter medium that continuously extends circumferentially, relative to an imaginary axis, around an element interior which forms at least partially a filtration volume,
and at least one end body which is fastened to an end face of the filter bellows,
wherein the at least one end body comprises at least one connecting section for fastening the round filter element to a housing cover of a filter housing.

Furthermore, the invention concerns a filter for urea-water solution (UWS)
with at least one filter housing that may have:
at least one UWS inlet for urea-water solution to be purified,
at least one UWS outlet for purified urea-water solution,
and at least one installation opening for at least one round filter element which is closed off so as to be openable by a housing cover,
with at least one round filter element which is arranged such in the filter housing that it separates the at least one UWS inlet from the at least one UWS outlet,
wherein the at least one round filter element has
a filter bellows with at least one filter medium that continuously extends circumferentially, relative to an imaginary axis, around an element interior which forms at least partially a filtration volume,
and at least one end body which is fastened to an end face of the filter bellows,
wherein the at least one end body comprises at least one connecting section for fastening the round filter element to the housing cover of the filter housing.

According to the invention, the central opening of the at least one end body is formed of a central insertion section and at least an outer flow-through section. By means of the central insertion section, a corresponding in particular hose-shaped separation section of a volume compensation device can be inserted into the element interior. The at least one outer flow-through section enables—depending on the flow direction of the urea-water solution in the filter—the inflow of the urea-water solution into the filtration volume that surrounds the separation section or flow out of the filtration volume. In this way, the round filter element can be fastened to a housing cover and can be mounted with the latter which is furnished with a volume compensation device.

The invention is used in connection with a so-called round filter element. The round filter element can be embodied as a round filter element with a round cross section, oval round filter element with an oval cross section, flat oval round filter element with a flattened oval cross section, conical round filter element in which the round cross section in axial direction tapers toward a main axis, conical oval round filter element in which the oval cross section in axial direction tapers at least in the direction of a transverse axis, conical flat-oval round filter element in which the flat oval cross section in axial direction tapers at least in the direction of a transverse axis, or as a round filter element with a different, in particular a square, cross section and/or a different axial cross-sectional course in the direction of an element axis.

The invention can be used in connection with an internal combustion engine, in particular an exhaust gas cleaning device for an internal combustion engine. The invention can be used in connection with a motor vehicle or outside of the automotive technology, in particular in industrial motors.

The central opening that is preferably circular round, comprises thus preferably a diameter that is dimensioned such that, when the separation section is inserted, the outer, for example, annular gap-shaped flow-through cross section is formed between this separation section and the rim of the opening. The diameter of the opening is preferably between 2 mm and 10 mm larger than the diameter of the separation section at the location where the separation section is surrounded by the opening in the mounted state.

In an advantageous embodiment, the at least one end body can comprise at least one sealing section arranged radially outwardly relative to the axis. With the at least one sealing section, it is possible to seal against a radially inner circumferential side of the housing pot of the filter housing. Thus, the at least one end body can seal additionally an annular space surrounding the round filter element relative to the environment.

Advantageously, the at least one sealing section can comprise at least one sealing groove. A corresponding seal, for example, a sealing ring, can be arranged in the sealing groove.

In a further advantageous embodiment, at least one connecting section can comprise at least one part of a releasable fastening device for fastening the at least one round filter element to the housing cover. In this way, the round filter element can be connected in a separable way with the housing cover. In case of an element exchange, the round filter element can be removed together with the housing cover from the filter housing. The fastening device can be released and the round filter element can be separated from the housing cover. A new round filter element can be connected by means of the corresponding fastening device to the housing cover and subsequently installed together with the latter in the filter housing.

In a further advantageous embodiment, the at least one connecting section can be part of a fastening device which, relative to the axis, is rotatable and/or insertable. Such fastening devices can be connected and released in a simple way.

Advantageously, the fastening device can comprise a locking connection. Locking connections can be realized in a simple way. They can be closed simply in particular by means of an insertion movement.

Advantageously, the locking device can have arranged thereat corresponding locking noses associated with the at least one end body and corresponding locking grooves associated with the housing cover, or vice versa. The locking noses or locking grooves associated with the at least one end body can be part of the at least one connecting section.

Advantageously, the fastening device can comprise a holding ring which, on the one hand, can be connected in particular releasably to the housing cover and, on the other hand, in particular releasably with the at least one end body. By means of the holding ring, the volume compensation device, in particular a corresponding fastening section of the volume compensation device, can be connected in particular releasably with the housing cover. Where applicable, the fastening section of the volume compensation device, in particular a sealing section, can be clamped, in particular buttoned in, between the holding ring and the housing cover, where applicable a support body of the volume compensation device at the housing cover.

In a further advantageous embodiment, the fastening device can comprise a plurality of fastening elements which are spaced apart from each other and, relative to the axis, circumferentially arranged. With the fastening elements, the fastening device can be connected to corresponding components on the part of the housing cover. Urea-water solution can flow through between the spaced-apart fastening elements. In this way, corresponding flow-through openings can be realized.

Advantageously, the fastening elements can comprise (locking) hook sections between which corresponding flow-through openings for the urea-water solution can be realized.

The connecting section, like the sealing section, is preferably radially outwardly arranged relative to the circumference of the end body. Moreover, it is preferred that the connecting section is arranged in particular in axial extension on the side of the sealing section which is facing away from the filter bellows and preferably adjoins the sealing section. In this context, the connecting section is preferably configured to be flowed through in radial direction, preferably—as described above—by means of the flow-through openings between fastening elements. However, also radial flow-through openings can be arranged axially between sealing section and fastening elements.

Moreover, the object is solved according to the invention for the filter in that the filter comprises at least one volume compensation device that comprises at least one flexible separation section with which a compensation volume is separated from a filtration volume of the filter.

In other respects, the features and advantages described in connection with the round filter element according to the invention and the filter according to the invention and their respective advantageous configurations apply inter alia correspondingly, and vice versa. The individual features and advantages, of course, can be combined with each other wherein further advantageous effects may result which exceed the sum of the individual effects.

BRIEF DESCRIPTION OF THE DRAWINGS

Further advantages, features, and details of the invention result from the following description, in which an embodiment of the invention will be explained in more detail with the aid of the drawing. A person of skill in the art will consider the features disclosed in the drawing, the description, and the claims in combination expediently also individually and combine them to expedient further combinations.

In the Figures, same components are provided with same reference characters.

DESCRIPTION OF PREFERRED EMBODIMENTS

Figure 1:
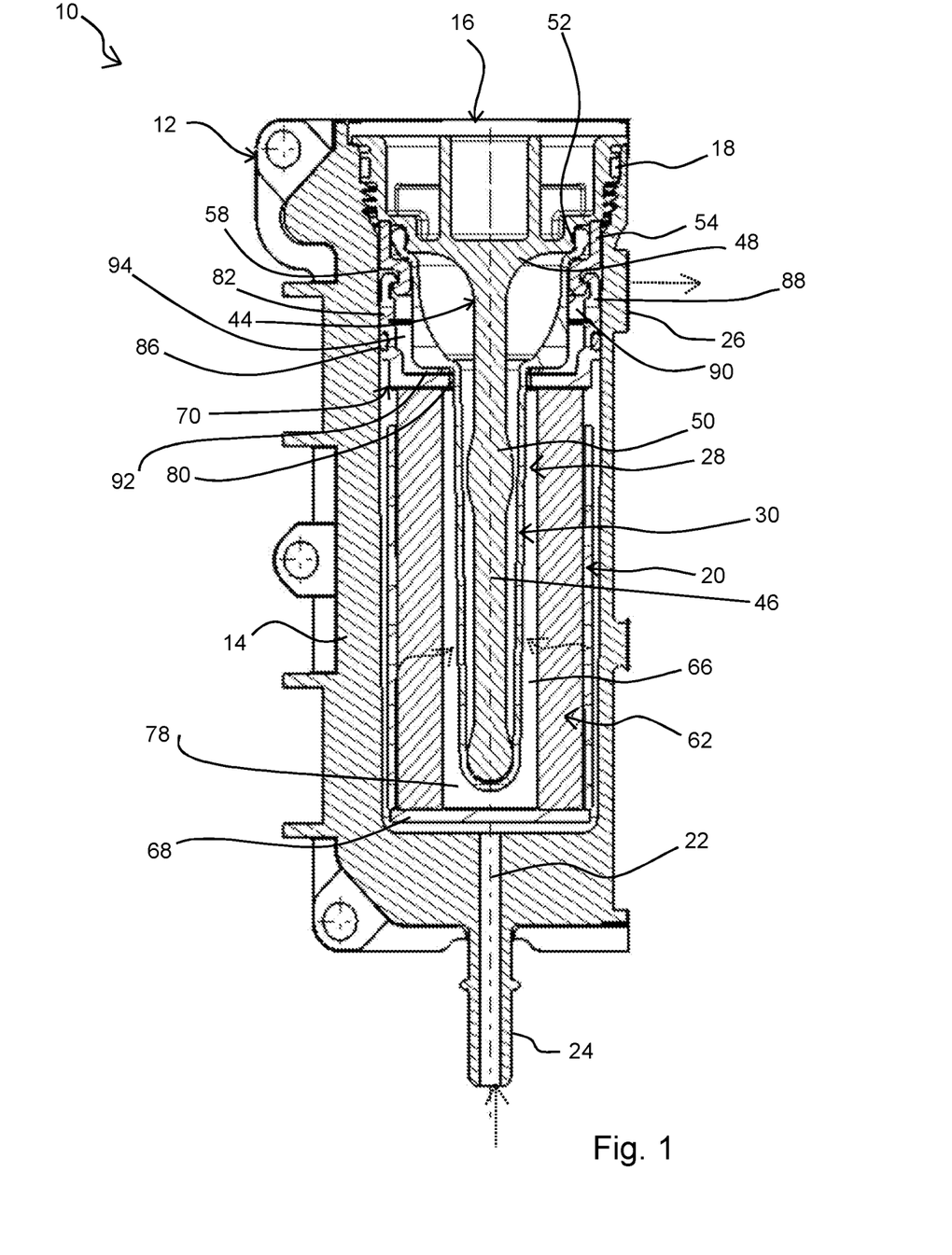
FIG. 1 shows in longitudinal section a filter for urea-water solution of an exhaust gas cleaning device of an internal combustion engine, with a round filter element and a volume compensation device for compensation of volume changes of the urea-water solution.

In FIG. 1, a filter 10 for urea-water solution (UWS) is shown in longitudinal section. The filter 10 can be a part of an exhaust gas cleaning device of an internal combustion engine and serve for filtration of urea-water solution.

The filter 10 comprises a filter housing 12 with a housing pot 14 and a housing cover 16. The housing cover 16 is screwed in an exemplary fashion coaxially to an axis 22 into an installation opening 18 of the housing pot 14 for a filter element 20.

When in the following "radial", "axial", "tangential", "coaxial" or the like is mentioned, then this relates to the axis 22, if nothing to the contrary is mentioned.

The housing pot 14 comprises an UWS inlet 24 for urea-water solution to be purified at the side which is axially oppositely positioned to the installation opening 18. In the vicinity of the installation opening 18, the housing pot 14 at its circumferential side comprises an UWS outlet 26 for purified urea-water solution. The filter element 20 is embodied as a so-called round filter element. The filter element 20 is arranged in the filter housing 12 such that it separates the UWS inlet 24 from the UWS outlet 26.

The filter 10 comprises furthermore a volume compensation device 28. The volume compensation device 28 is preferably combined, as shown, with the housing cover 16. It serves for compensation of volume changes of the urea-water solution, for example, due to temperature changes. For example, volume changes of the urea-water solution upon freezing can be compensated.

In the following, the volume compensation device 28 will be explained in more detail with the aid of FIGS. 2 to 6.

The volume compensation device 28 comprises a compensation membrane 30. The compensation membrane 30 is comprised preferably of elastic flexible material, for example, of plastic material, for example, of an elastomer.

Figure 4:
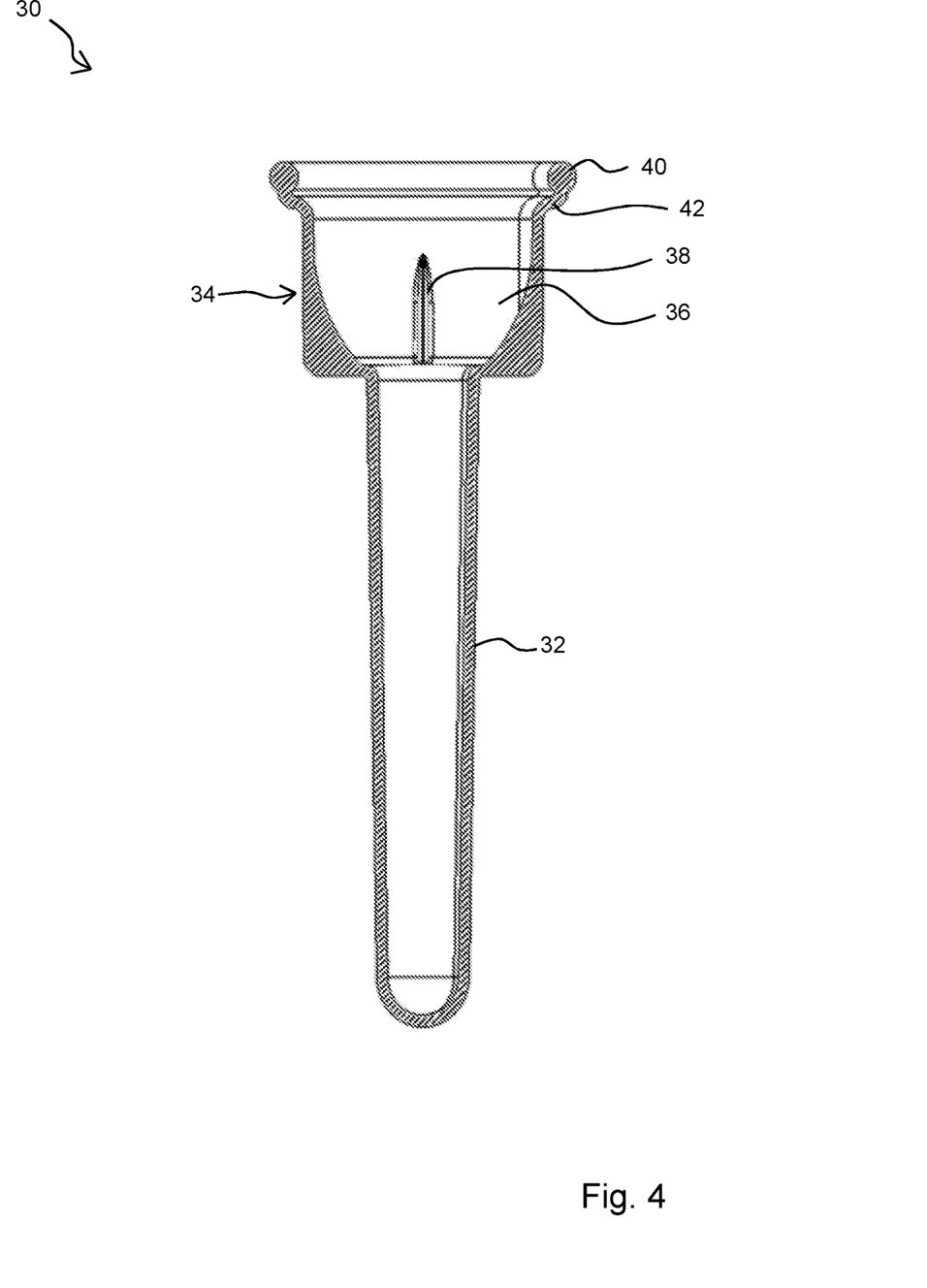
FIG. 4 shows a longitudinal section of a compensation membrane of the volume compensation device of FIGS. 1 to 3.

The compensation membrane 30 comprises preferably, as shown, a hose-shaped separation section 32 which in the installed state is coaxial and which is closed at its end which is facing away from the housing cover 16. At its other end, the separation section 32 passes in a one-piece configuration into a fastening section 34 which is coaxial in the installed state. The fastening section 34 is approximately circular cylindrical at its radially outer circumferential side. A radially outer diameter of the fastening section 34 is greater than a radially outer diameter of the separation section 32.

The fastening section 34 surrounds preferably, as shown, an approximately bell-shaped part of a compensation volume 36. The compensation volume 36 extends from the interior of the fastening section 34 into the interior of the separation section 32.

Figure 5:
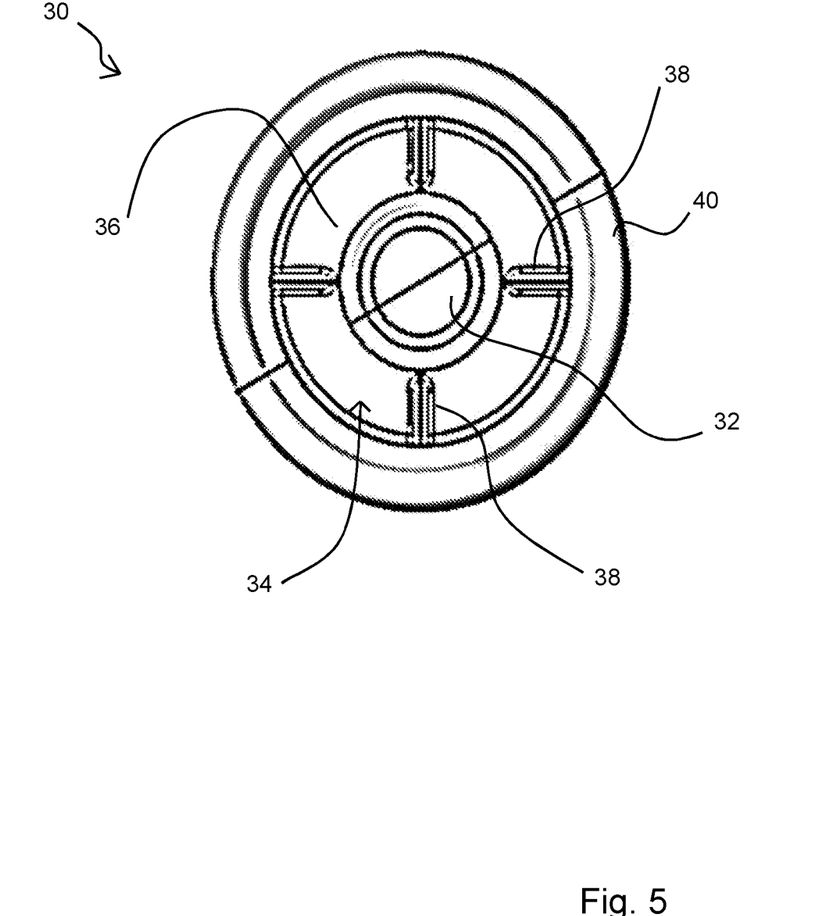
FIG. 5 shows a plan view of a fastening section of the compensation membrane of the volume compensation device of FIGS. 1 to 4.

At its radially inner circumferential side, the fastening section 34 preferably comprises, as shown, four reinforcement ribs 38. The reinforcement ribs 38 extend each radially inwardly and in axial direction. The reinforcement ribs 38 serve for stabilizing the fastening section 34.

At its free rim which is facing away from the separation section 32 in axial direction, the fastening section 34 preferably, as shown, passes into an annular sealing section 40. The sealing section 40 is connected in a one-piece configuration by means of a flexible connecting region 42 to the fastening section 34. The sealing section 40 has in an exemplary fashion a circular profile. It projects past the axial projection of the fastening section 34 in radial direction outwardly.

Figure 2:
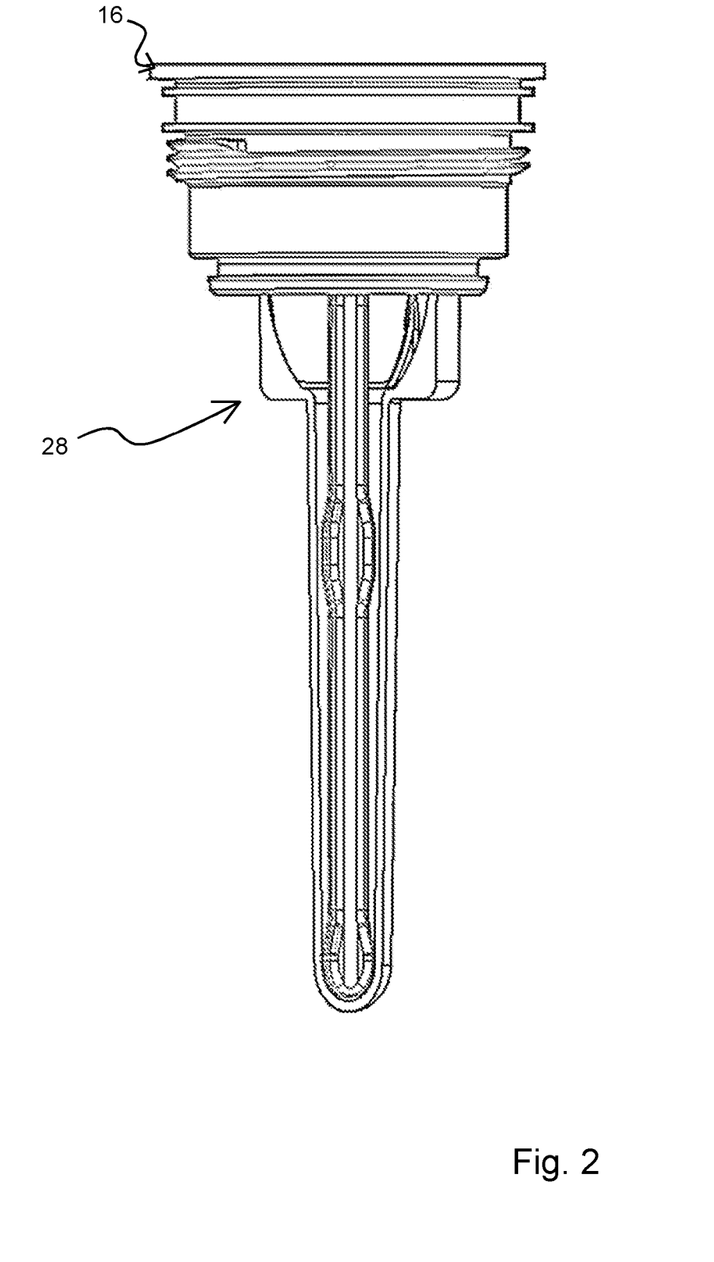
FIG. 2 is a side view of a housing cover of a filter housing of the filter of FIG. 1 with the volume compensation device.
Figure 3:
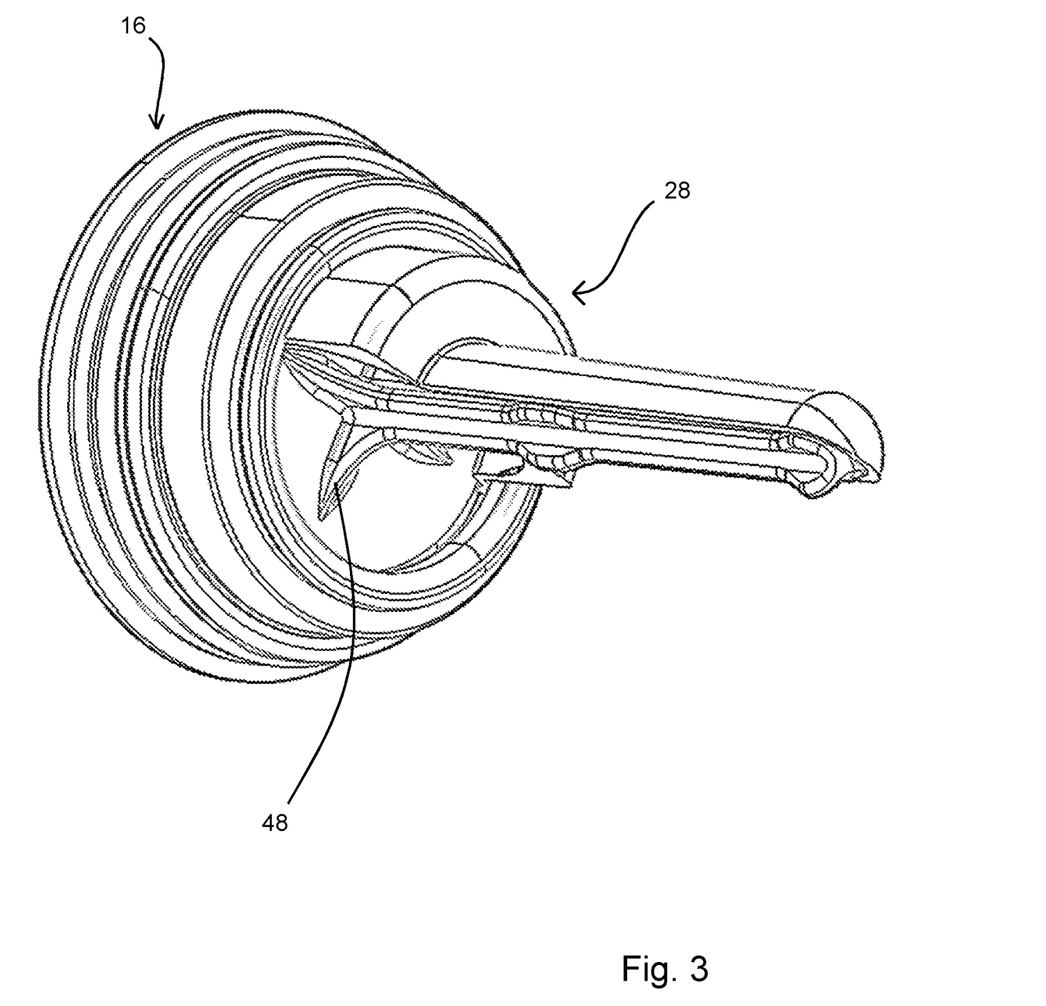
FIG. 3 shows the housing cover of FIG. 2 in another perspective.

As shown, the volume compensation device 28 comprises moreover preferably a shape-stable support body 44. The support body 44 is connected in an exemplary fashion in a one-piece configuration with the housing cover 16. The support body 44 is located at the inner side of the housing cover 16 which is facing the interior of the housing pot 14.

The support body 44 comprises preferably, as shown, a rod-shaped support section 46 which is coaxial in the mounted state. The support section 46 extends axially away from the inner side of the housing cover 16. As shown, the support section 46 is connected, for example, by a connection 48, which is cross-shaped viewed in axial direction, to the inner side of the housing cover 16.

At its free end, the support section 46 is preferably widened, as shown, in a drop shape. In longitudinal direction approximately at half the length, the support section 46 also comprises preferably a circumferential widened portion 50. Otherwise, the support section 46 has an approximately constant outer diameter across its length.

At the end of the support section 46 with the preferred cross-shaped connection 48, the inner side of the housing cover 16 is configured further preferred, as shown, as a holding section 52. The holding section 52 serves for holding the sealing section 40 of the compensation membrane 30. The holding section 52 has radially outwardly a step-like receptacle into which the sealing section 40 can be buttoned.

Radially outwardly, the holding section 52 is surrounded preferably, as shown, by an approximately hollow cylindrical coaxial holding ring 54. The holding ring 54 comprises at its side facing away from the housing cover 16 a step in radially inward direction whose radially inner side in the mounted state rests against the connecting region 42 of the compensation membrane 30 and clamps it against the holding section 52. In this way, the sealing section 40 is buttoned in a holding space 56 between the holding ring 54 and the holding section 52.

The region of the holding ring 54 behind the step at the side which is facing away from the housing cover 16 forms further preferred at the radially outer circumferential side a circumferentially continuous locking groove 58 of a fastening device which as a whole is identified by 60. The fastening device 60 serves for fastening the filter element 20 at the housing cover 16. A rim of the holding ring 54 which is facing the filter element 20 is beveled toward the locking groove 58.

The filter element 20 comprises a filter bellows 62 with a filter medium 64. The filter medium 64 circumferentially surrounds continuously an element interior 66 of the filter element 20. At the end face of the filter element 20 which in axial direction is facing away from the housing cover 16, an end disk 68 is arranged which closes off the element interior 66 at this end face.

In the illustrated embodiment, the filter medium 64 is flowed through by the urea-water solution to be purified in a radial direction from the exterior to the interior. For the invention, the flow direction is however not important so that also a flow in radial direction from the interior to the exterior is possible.

At the end face which is facing the housing cover 16, the filter element 20 has a connecting end body 70. The connecting end body 70 in the following will be explained in more detail with the aid of the detail drawing of FIG. 6.

Figure 6:
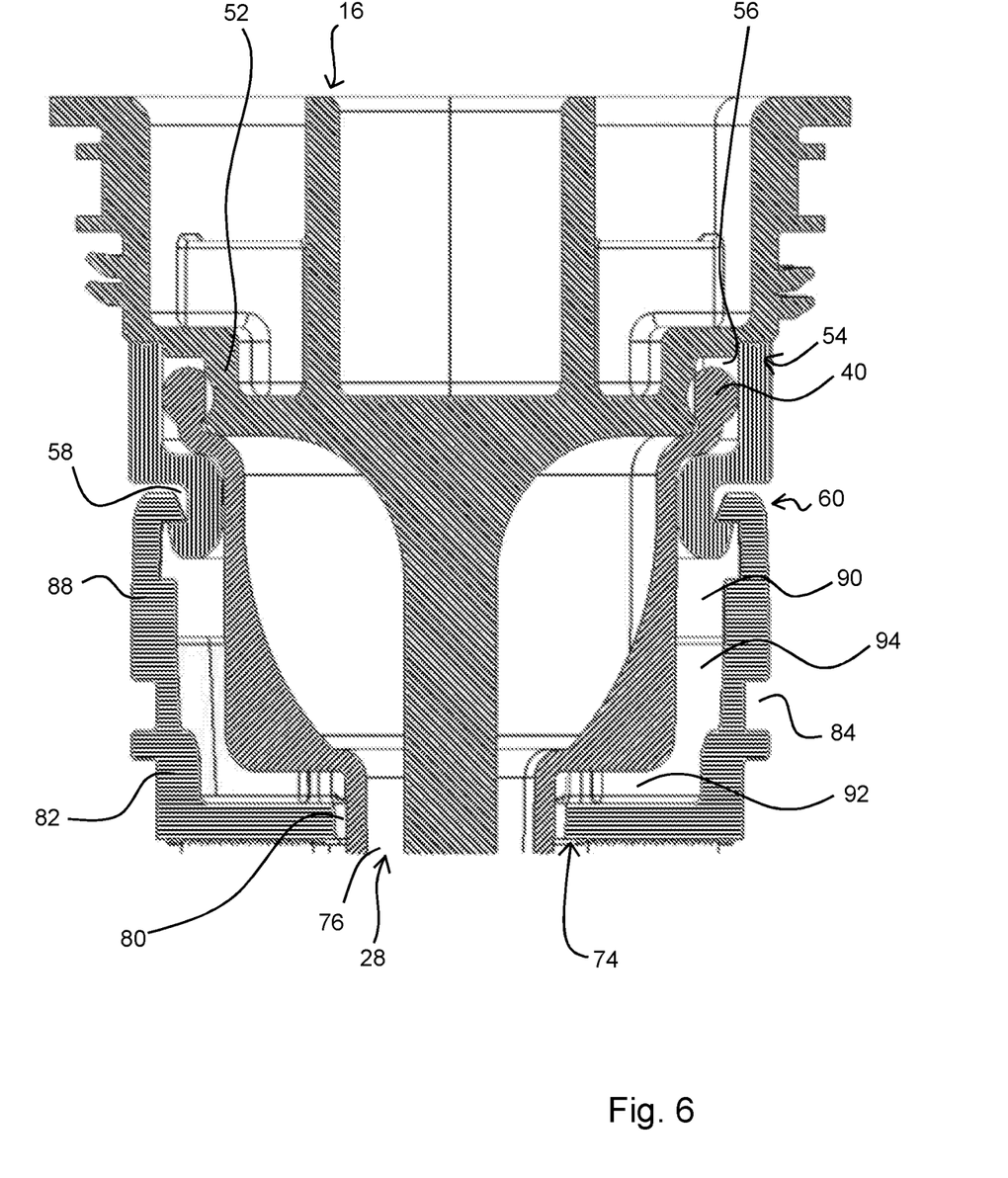
FIG. 6 shows a detail view of the longitudinal section of the housing cover with the volume compensation device and a connecting end body of the round filter element of the filter of FIG. 1.

The connecting end body 70 comprises an annular disk section 72 which is arranged at the end face of the filter bellows 62. The annular disk section 72 comprises a circular coaxial opening 74. The central opening 74 comprises a central insertion section 76. Through the insertion section 76, the separation section 32 of the compensation membrane 30 and the rod-shaped support section 46 of the support body 44 are guided into the element interior 66. In the mounted state, the separation section 32 and the rod-shaped support section 46 extend almost across the entire axial length of the element interior 66. The volume of the element interior 66 which surrounds the separation section 32 forms a filtration volume 78.

The insertion section 76 of the opening 74 is surrounded circumferentially by an outer preferably annular flow-through section 80. The flow-through section 80 can be flowed through by the urea-water solution originating from the filtration volume 78. In the outer flow-through section 80, the radially outer circumferential side of the separation section 32 is spaced apart from the radially inner circumferential side of the annular disk section 72 that surrounds the opening 74. In this context, it is preferred that the flow-through section 80 at least primarily or completely can be flowed through annularly circumferentially, i.e., is embodied open in order to minimize pressure losses.

Radially outwardly, the annular disk section 72 preferably passes in a one-piece configuration into a coaxial cylinder section 82. The cylinder section 82 extends from the annular section 72 in axial direction away from the filter bellows 62.

At its radially outer circumferential side, the cylinder section 82 comprises further preferred a circumferentially continuous sealing groove 84. In the sealing groove 84, an annular seal 86 is arranged which seals, acting in radial direction, relative to the radially inner circumferential side of the housing pot 14. With the annular seal 86, the raw fluid side of the filter element 20 which is surrounding the filter element 20 radially outwardly is sealed relative to the environment.

Further preferred, and as shown, the cylinder section 82, at its free rim at the side which is facing in axial direction away from the annular disk section 72, passes in a one-piece configuration into several locking hooks 88. The locking hooks 88 are arranged circumferentially spaced apart relative to each other. They extend preferably substantially in axial direction.

At its radially inner circumferential side, each locking hook 88 preferably, as shown, has a locking nose with which it can engage the locking groove 58 of the holding ring 54. Between neighboring locking hooks 88 a flow-through opening 90 is realized, respectively, through which the urea-water solution can flow.

When the filter element 20 is mounted, between the connecting end body 70, respectively, the annular disk section 72 and the fastening section 34 of the compensation membrane 30, a fluid gap 92 is realized that extends axially, circumferentially, and radially. Urea-water solution which is coming from the filtration volume 78 through the outer flow-through opening section 80 of the opening 74 can flow through the fluid gap 92. The urea-water solution can reach, coming from the fluid gap 92, an annular space 94 which is extending between the radially outer circumferential side of the fastening section 34 and the radially inner circumferential side of the cylinder section 82 of the connecting end body 70. From the annular space 94, the urea-water solution can flow through the flow-through openings 90 into a connecting space which is hidden in the Figures and which extends to the UWS outlet 26.

In case of a volume change of the urea-water solution contained in the filter 10, respectively, the filtration volume 78, for example, if it freezes and expands, the expanding urea-water solution presses against the separation section 32 and deforms it in radially inner direction against the inner pressure of the compensation volume 36. During the compensation process, the separation section 32 can be supported at the free end of the rod-shaped support section 46 and at the widened portion 50. In this way, it can be prevented that the separation section 32 collapses. With the volume compensation device 28, the volume change of the urea-water solution in the filtration volume 78 is compensated and it is prevented in this way that components of the filter 10 burst. During the compensation process, the flow-through section 80 can be widened.

As soon as the urea-water solution thaws and thereby the volume is reduced again, the inner pressure of the compensation volume 36 ensures that the separation section 32 is widened again.

What is claimed is:
1. A filter for a urea-water solution, the filter comprising:
a filter housing comprising
at least one inlet for the urea-water solution to be purified,
at least one outlet for the urea-water solution that has been purified,
an installation opening, and an
openable housing cover closing off the installation opening;
a round filter element configured to be insertable through the installation opening and arranged such inside the filter housing that the round filter element separates the at least one inlet from the at least one outlet,
wherein the round filter element comprises:
a filter bellows comprising
at least one filter medium that continuously extends circumferentially, relative to a filter element axis, around an element interior of the round filter element,
wherein the element interior forms at least partially a filtration volume of the filter;
at least one end body fastened to an end face of the filter bellows,
wherein the at least one end body comprises
at least one connecting section configured to fasten the round filter element to the housing cover of the filter housing;
at least one volume compensation device comprising
a hollow elastic compensation membrane configured to separate a compensation volume from the filtration volume of the filter,
the hollow elastic compensation membrane connected to the housing cover, the hollow elastic compensation membrane having a hollow hose shaped section which extends axially through a central opening of the at least one end body of the round filter element, and extends into the element interior of the filter bellows;
wherein the housing cover includes a rod-shaped shape-stable support body fixed onto the cover and projecting axially inwardly into a hollow interior of the hollow elastic compensation membrane from a first axial end towards a second axial end of the elastic compensation membrane such that the rod-shaped shape-stable support body also projects into the element interior of the filter bellows;
wherein the compensation volume is formed in the hollow interior of the hollow elastic compensation membrane by open space between the hollow elastic compensation membrane and the rod-shaped shape-stable support body, the open space forming the compensation volume for compensating for volume changes of the urea-water solution.
2. The filter for a urea-water solution according to claim 1, wherein
the at least one end body comprises
at least one sealing section arranged radially outwardly relative to the filter element axis.
3. The filter for a urea-water solution according to claim 1, wherein
the at least one connecting section comprises
at least one part of a detachable fastening device configured to fasten the round filter element to the housing cover.
4. The filter for a urea-water solution according to claim 1, wherein
the at least one connecting section is a part of a fastening device, wherein the fastening device is configured to be rotatable and/or axially connectable relative to the filter element axis.

5. The filter for a urea-water solution according to claim 1, wherein
the at least one connecting section comprises
a plurality of fastening elements circumferentially arranged so as to be spaced apart from each other relative to the filter element axis.

6. The filter for a urea-water solution according to claim 1, wherein
the at least one end body comprises
an annular disk section comprising
an outer circumference,
wherein the at least one connecting section, relative the outer circumference of the annular disk section, is arranged radially outwardly and at a side of a sealing section of the at least one end body facing away from the filter bellows in an axial direction of the filter element.

7. The filter for a urea-water solution according to claim 1, wherein
the at least one connecting section is embodied to be flowed through in a radial direction relative to the filter element axis.

* * * * *